(No Model.)  5 Sheets—Sheet 3.

J. A. HUTCHINSON.
MACHINE FOR FORGING HORSESHOE NAILS.

No. 372,623. Patented Nov. 1, 1887.

Witnesses
W. C. Corliss
A. M. Best

Inventor
John A. Hutchinson
By Coburn & Thacher
Attorneys (No Model.) 5 Sheets—Sheet 4.

J. A. HUTCHINSON.
MACHINE FOR FORGING HORSESHOE NAILS.

No. 372,623. Patented Nov. 1, 1887.

Witnesses
W. C. Corlies
A. M. Best.

Inventor
John A Hutchinson
By Coburn & Thacher
Attorneys

UNITED STATES PATENT OFFICE.

JOHN A. HUTCHINSON, OF CHICAGO, ILLINOIS, ASSIGNOR TO ABRAHAM W. KINGSLAND, OF SAME PLACE.

MACHINE FOR FORGING HORSESHOE-NAILS.

SPECIFICATION forming part of Letters Patent No. 372,623, dated November 1, 1887.

Application filed April 7, 1887. Serial No. 233,998. (No model.)

*To all whom it may concern:*

Be it known that I, JOHN A. HUTCHINSON, a citizen of the United States, residing at Chicago, in the county of Cook and State of Illinois, have invented certain new and useful Improvements in Machines for Forging Horseshoe-Nails, which are fully set forth in the following specification, reference being had to the accompanying drawings, in which—

Figs. 1 to 12, inclusive, are on one scale; Figs. 13 to 18, inclusive, on a somewhat enlarged scale; and Figs. 19 to 21, inclusive, upon a scale still further enlarged to about half-size.

My invention relates to a machine for forging horseshoe-nails, or, rather, blanks therefor, which are afterward finished on other machines. The machine is of the general type known as the "Dodge" machine; and the invention relates, mainly, to improvements in the feeding and cutting mechanisms, though some other devices of minor importance are included.

I will proceed to describe in detail a machine in which I have embodied my invention for practical use in one way, and will then point out in claims the particular improvements which I believe to be new and wish to secure by Letters Patent.

Figure 1:
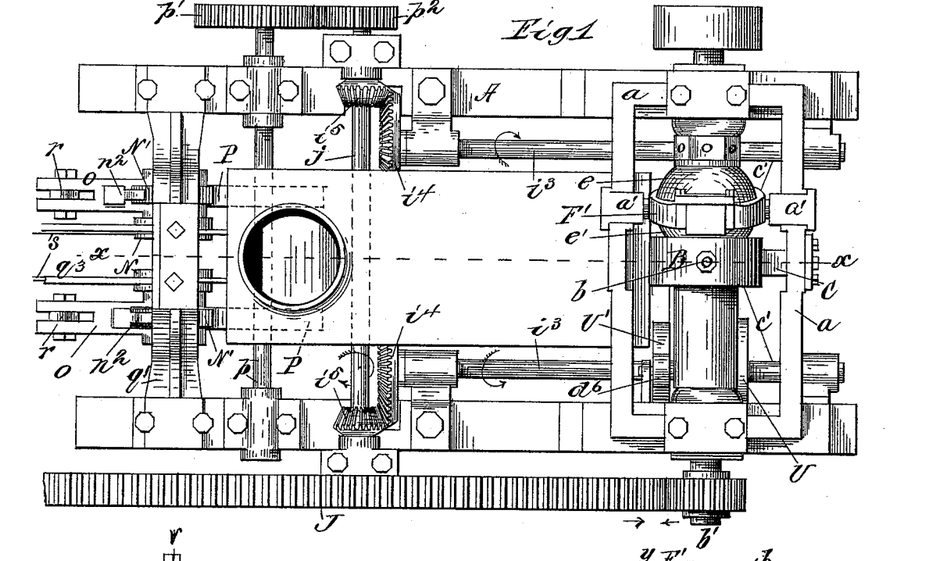
Figure 1 represents a plan of a machine embodying my improvements.
Figure 2:
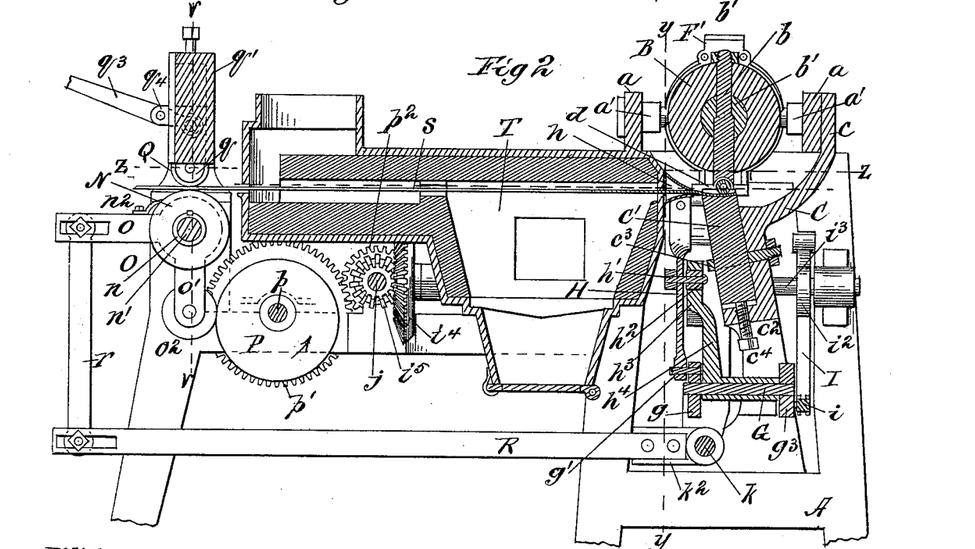
Fig. 2, a section of the same, taken on the line $x\,x$ of Fig. 1.
Figure 3:
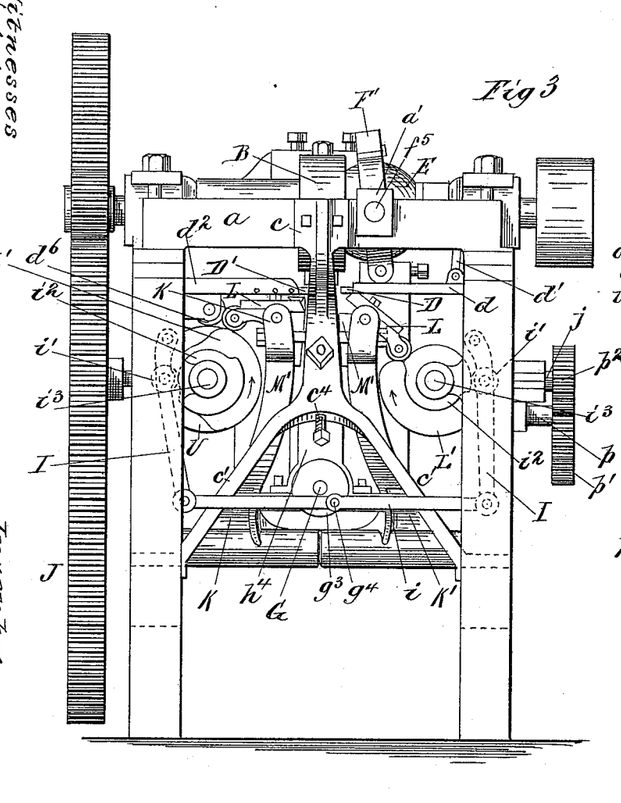
Fig. 3, a rear end elevation of the same.

In the drawings, A represents a main or supporting frame. At the rear end of this frame a supplementary frame, $a$, is arranged transversely of the main frame and rising therefrom a slight distance. The disk B, which carries the roller-hammer $b$, is fixed on a shaft, $b'$, which is mounted in suitable bearings supported on the main frame, the said shaft being arranged within the transverse frame $a$. The anvil-support C has three arms or branches, one, $c$, being upright and attached at its upper end to the rear bar of the frame $a$. This is turned inward and extends down underneath the hammer-disk some distance, as shown in Fig. 2 of the drawings. It then branches out into two side arms, $c'$, which extend downward and outward to the opposite sides of the main frame, to which they are respectively secured, as shown in Fig. 3 of the drawings.

Figure 14:
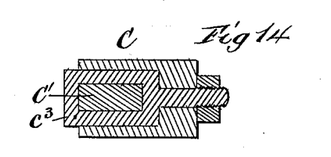
Fig. 14, a detail plan section of the anvil and its fastening device.

About at the junction of the three branching arms a seat, $c^2$, is provided for the anvil C', the inner face of the main body of the arm $c$ being cut out to form a recess for the anvil, and the latter is held in place by a clasp-band, $c^3$, which surrounds it, and is provided at the rear with a shank that passes through the back of the anvil-support, and is secured by a nut, as shown in Fig. 14 of the drawings. A set-screw, $c^4$, passes up through the seat of the anvil, so as to bear directly against the lower end of the latter, thereby providing means for adjusting the anvil vertically. These parts are arranged so that the upper end of the anvil will have the usual position directly underneath the roller-hammer when at the bottom of its path. The anvil is firmly supported and at the same time is easily adjusted and can be readily removed. On one side of the anvil is a movable die or hammer, D, and on the other side is a stationary die, D', these dies being for the purpose of operating upon the sides or edges of the nail. The movable die is mounted in a carrier, $d$, which at its outer end is supported by a swinging link, $d'$, the upper end of which is fastened to a suitable support on the frame. The inner end of the carrier is held up by the device which imparts to it a reciprocating motion, and which I will now describe.

Figures 19, 20, 21:
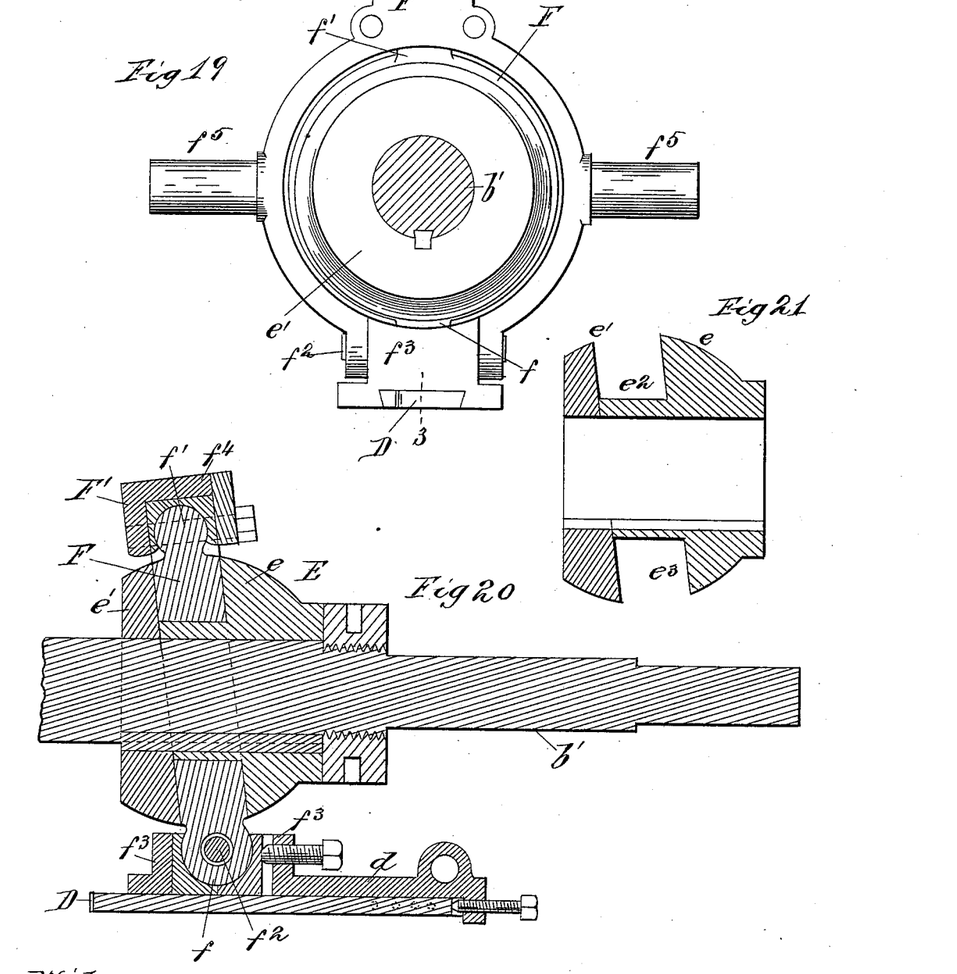
Fig. 19, a detail elevation of the device for reciprocating the side hammer.
Fig. 20 a section of the same, taken on the line 3 3 of Fig. 19.
Fig. 21, a detail section of the rotating cam which drives this hammer.

On the shaft $b'$ is a cam, E, which is composed of two cheek-pieces, $e$ $e'$, fastened to the shaft in any suitable way at one side of the roller-hammer and having their opposing faces set at an angle to the axis of the shaft, as shown in Fig. 21 of the drawings. One of the cheek-pieces $e$ may be provided with a sleeve-hub, $e^2$, extending over the axle to the adjacent piece, and the two may be fastened to the shaft in any convenient way. It is obvious that there will thus be formed a groove, $e^3$, between the cheek-pieces around the shaft, which will act as a cam-groove, because it lies in a plane which is inclined to the axis of the shaft. A ring or collar, F, is fitted in this groove loosely on the sleeve-hub which surrounds the shaft. This ring is provided with ball-projections on its circumference—one, $f$, below the shaft, and the other, $f'$, above it. The ball $f$ is seated in a socket on the hammer-carrier $d$, and the upper one, $f'$, is received in a suitable seat in the upper portion of a second ring or collar, F', which is arranged loosely around the collar F and just outside of it. This ring F' is connected below the shaft to the hammer-carrier by means of a bolt, $f^2$, which passes through the flanges of the seat that receives the ball of the inner ring, and also through the latter and through the lugs on the outer ring, which embrace the seat, as shown in Figs. 19 and 20 of the drawings. A proper bearing is provided for these ball-connections by cheek-pieces $f^3$ in the seat on the hammer-carrier and by piece $f^4$ in the upper portion of the ring F'. The bolt at the lower joint should be somewhat loose in the ball-bearing to prevent binding.

It will be seen that the hammer-carrier is connected to both rings, and that the two latter are also connected together, so that the vibration of the inner ring caused by the rotation of the shaft will not only act upon the carrier, but also upon the outer ring, which in turn acts upon the carrier. The strain is thus taken at two points on the inner ring, one above and one below the shaft, instead of at the latter point alone, as has been done in earlier constructions. The ring F' is provided with short trunnions $f^5$ on each side midway between the upper and lower ring-joints, and these trunnions are mounted in suitable bearings, $a'$, on the side pieces of the transverse frame $a$, and so the ring is free to vibrate on its trunnions. The connection of the hammer-carrier to the rings obviously supports the inner end of the former, and the vibration of the rings caused by the cam-groove when the shaft is revolved will of course impart a swinging reciprocating motion to the hammer-carrier, thereby bringing the hammer up against one edge of the nail-blank as it lies on the anvil, the opposite edge being opposed by the stationary hammer on the opposite side of the anvil.

The mechanism for holding and feeding forward the rods is part at one end and part at the other end of the machine. At the rear end of the machine, underneath the anvil and some distance below it, is a short shaft, G, mounted in suitable bearings lengthwise of the machine. On the front end of this shaft is a crank-wheel, $g$, which is provided with two crank-pins, $g'$ and $g^2$, arranged about a quarter of a circle apart. The other end of the shaft is provided with a crank-wheel, $g^3$, having a single crank-pin, $g^4$. Upright bars H and H' are attached at their lower ends, respectively, to the crank-pins $g'$ and $g^2$, and each carries upon its upper end a guide or holder, $h$, which is adapted to receive a nail-rod and flares toward the front for convenience of guiding the rod into this holder.

Figure 4:
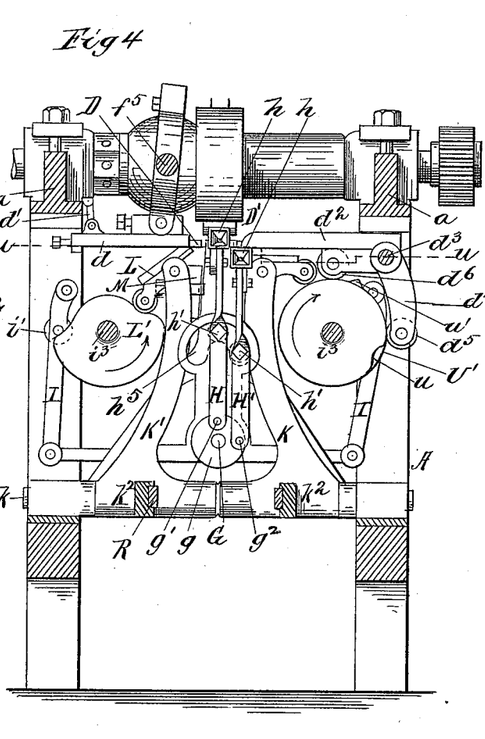
Fig. 4, a transverse section of the same, taken on the line $y\,y$ of Fig. 2.
Figures 5, 6, 7, 8, 9, 10, 11:
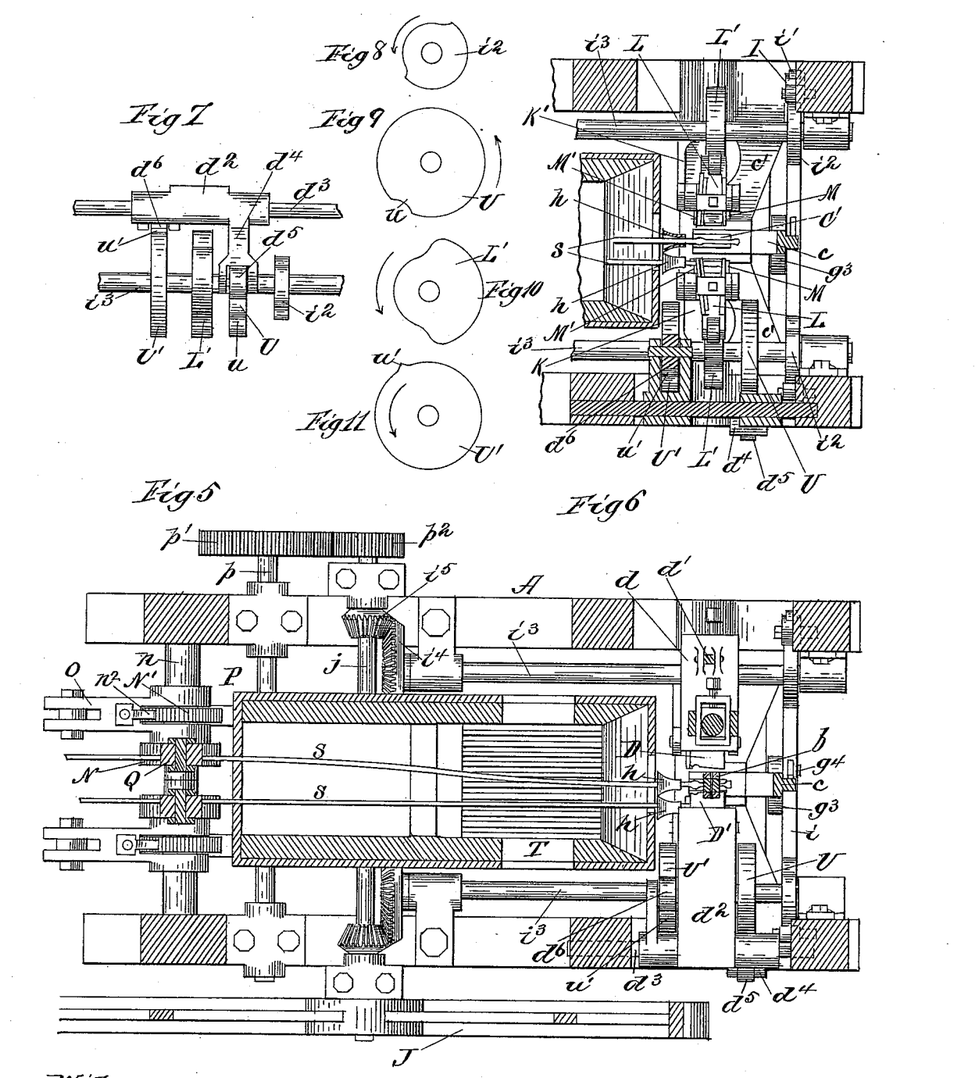
Fig. 5, a plan section of the same, taken on the line $z\,z$ of Fig. 2.
Fig. 6, a detail plan section taken on the line $u\,u$ of Fig. 4.
Fig. 7, a detail elevation of the cam devices for operating the cutters and changing the feed.
Figs. 8, 9, 10, and 11, side elevations of the several cams of said mechanism detached.
Figure 12:
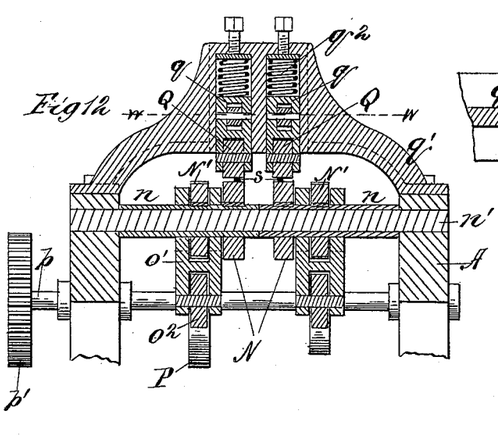
Fig. 12, a detail section taken on the line $v\,v$ of Fig. 2.
Figure 13:
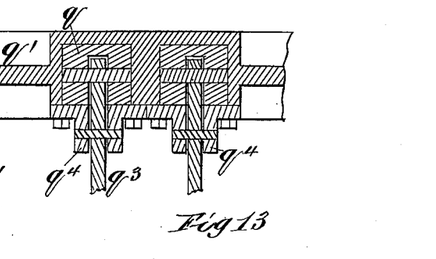
Fig. 13, a plan section taken on the line $w\,w$ of Fig. 12.

About midway of its length each of these holder-bars is provided with a pin, $h'$, which projects rearward and is provided with an anti-friction roller, $h^2$. These pins, with their rollers, are received in a cam-guide, $h^3$, which is on the upper end of an upright standard, $h^4$, just back of the wheel $g$. A circular slot, $h^5$, is cut in this piece, which receives the pins and extends transversely of the machine, as shown in Fig. 4 of the drawings. Now, it is evident that when the shaft G is rocked the rod-holders will be alternately raised and lowered. At the same time they will also be moved laterally by the action of the circular guide-slot in which the pins work. These parts are so arranged that when one of the crank-pins ($g'$, for instance) is at its highest point, as shown in Fig. 4 of the drawings, the corresponding bar will be raised to its fullest extent, and the holder of said bar will stand directly in front of the anvil, as shown in Fig. 5 of the drawings, and will also be at such a height that the end of the rod projecting therefrom will lie in proper position on the anvil for the operation of the hammers. This position is obtained by the joint action of the crank-pin and the guide-slot, the latter being arranged so that when the crank-pin reaches its highest point it will be in line with the crest of the circular slot, and so the pin on the bar will be thrown to its farthest extent inward as well as upward. When the bar H is in this position, the bar H' is at its lowest depression and at the limit of its lateral movement, the pin thereon being at one end of the guide-slot, and the holder on this bar will consequently be depressed and carried to one side, so that it will stand below and at one side of the holder on the bar H. The position of the two bars in this relation is clearly shown in Fig. 4 of the drawings. Now, if the shaft G be rocked in the opposite direction, these devices will be reversed in their relation. The arm H and its holder will be carried downward and to one side, while the arm H' will be brought up into operative position in line with and in front of the anvil. The oscillation of the shaft G is produced by levers I, which are pivoted to suitable supports at each side of the machine and are arranged in the same plane as the crank-pin on the wheel $g^3$, to which the lower ends of the levers are respectively connected by pitmen $i$. The upper ends of these levers are provided with anti-friction rollers $i'$, which are acted upon by cams $i^2$ on shafts $i^3$ at each side of the machine. These shafts are provided at their forward ends with bevel-gears $i^4$, which are rotated by pinions $i^5$ on the shaft $j$ of the main gear-wheel J. The cams then are constantly revolving, and they are so arranged relatively and are of such form that they will alternately vibrate the levers I at the proper time to oscillate the shaft G and change the relative position of the rod-holders.

Figures 15, 16, 17, 18:
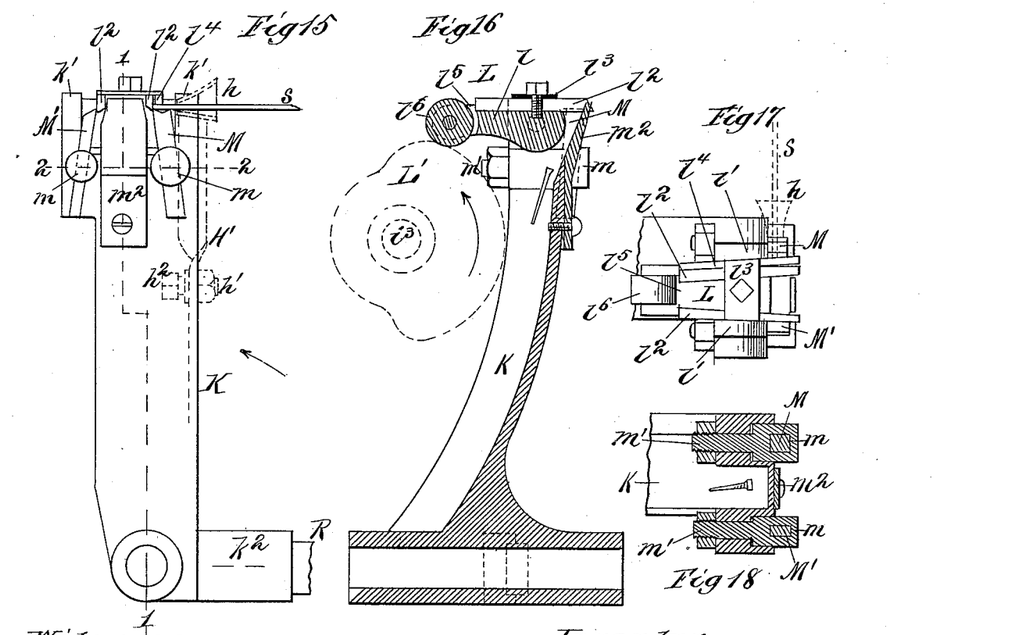
Fig. 15, a side elevation of one of the feed-carrying arms.
Fig. 16, a detail section taken on the line 1 1 of Fig. 15.
Fig. 17, a detail plan of one of the cutters.
Fig. 18, a plan section taken on the line 2 2 of Fig. 15.

The cutting devices, which also constitute a part of the feed, will now be described. Two upright arms, K and K', are mounted loosely on a shaft, $k$, in the lower part of the frame, so that they may vibrate freely thereon. They are arranged a little ahead of the rod-holders, just described, and one on each side of the anvil. Each arm is provided at its upper end with a kind of yoke, which is formed by lugs $k'$ at the front and rear of the arm. Within this yoke the cutter-holder L is arranged, being mounted by journals in the lugs, so that it is free to vibrate on the upper end of the arms, the axis of motion being lengthwise of the machine. The central portion of this holder is a level bed, $l$, on each side of which rises a short flange, $l'$. Two cutters, $l^2$, are placed upon the bed and are fastened in position by a cross-bar, $l^3$, between the flanges, which is held down by a bolt and nut. The cutters are arranged so that their free ends extend inward beyond the bed and stand apart a distance equal to the length of the nail-blank. The back cutter is placed up against the flange on that side of the bed; but a clamping-rod, $l^4$, is placed outside of the front cutter, between it and the flange. This clamp extends beyond the bed even with the cutter, but does not project downward so far as the latter, its lower face being arranged above the lower face of the cutter about the thickness of a nail-rod. The vibration of the holder upon its journals will obviously vibrate the cutters in a direction transverse to the direction of the nail-rod. The holders are vibrated by means of a tail-piece, $l^5$, projecting outward from each and resting upon a cam, L', which is fixed on each of the side shafts, $i^3$. These cams are constructed and arranged relatively so that when one is operating to throw the cutter-holder up in its working movement the other permits the corresponding holder to drop down in inoperative position. These relative positions are shown in Fig. 3 of the drawings. To save friction, a small roller, $l^6$, is placed in the end of the tail-piece of each holder. The fixed cutters M and M' are mounted in socket-pieces $m$, by which they are clamped firmly to the inside of the arms K, as shown in Figs. 15 and 18 of the drawings. These socket-pieces fit in suitable recesses in the inside of the arms K, within which they have a limited movement, and are provided with shanks $m'$, which pass through the arms and receive nuts on their outer ends, by which they are drawn into their recesses to clamp the cutters firmly against the arm. The stationary cutters are arranged so that the vibrating cutters, described above, will just pass down between them, as shown in Fig. 15 of the drawings, thereby cutting off the blank formed on the end of the rod, and at the same time cutting off the point of the blank. The front stationary cutter, M, has its upper face notched, preferably, as seen in Fig. 15, and the clamp $l^4$ is brought down upon the rod above this cutter just about as the blank is severed, as seen in the figure just mentioned. The notching of the cutter helps to hold the end of the rod firmly between it and the clamp. The arms K are of such length that the stationary cutters stand about on a level with the rod holders, heretofore described, when they are carried down into their lowest position, and so that one of these holders when thus swung down will bring the formed blank on the end of the rod from the anvil down upon the stationary cutters. The actuating-cam of the corresponding pair of movable cutters then at once vibrates the latter, thus cutting off the blank, and at the same time gripping the end of the rod. A guard, $m^2$, is secured to the inside of each arm K, extending upward at an inclination away from the arm to and between the ends of the cutters. This guard prevents the blanks, when cut off, from falling inward and directs them outward from the machine, as shown in Fig. 16.

At the front of the machine are feed-rollers N, which are fastened to sleeves $n$, mounted loosely on a stationary shaft, $n'$. On the same sleeves are also fixed ratchet-wheels N', which are actuated by pawls $n^2$, mounted on one arm, $o$, of bell-crank levers O, that are loose on the sleeves, and at their inner ends are forked to embrace the ratchet-wheels. The other arm, $o'$, of these levers depends below the shaft, and is brought into contact with cams P on a shaft, $p$, that are arranged to vibrate these levers alternately. Rollers $o^2$ may be placed on the ends of the arms $o'$, to reduce friction. The shaft $p$ is revolved by means of a gear-wheel, $p'$, on one end thereof, which engages with a pinion, $p^2$, on the end of the main shaft $j$. Above the feed-rollers N are smaller free rollers, Q, which are mounted in an ordinary way in suitable journal-blocks, $q$, held in a yoke-frame, $q'$. Springs $q^2$ are arranged above the blocks, so as to permit them to yield somewhat, and the frame may be raised bodily by means of a lever, $q^3$, as it is mounted in suitable ways in the sides of standards $q^4$.

Each of the arms K is provided at its lower end with a toe-piece, $k^2$, which projects toward the forward end of the machine. A long lever, R, is fastened at one end to each of these projections, and is extended forward to the front end of the machine, where it is connected by a link-rod, r, to the horizontal arm o of the bell-crank levers O. Obviously, the vibration of the levers O will cause, through this connection, a corresponding vibration of the arms K, and it will be seen from Fig. 2 of the drawings that as the lever O is vibrated to feed the roller N forward it will move the lever R upward, thereby vibrating the arm K toward the rear end of the machine. Now, the devices are so timed that this operation commences just after the blank has been cut off, as described above, and the end of the rod gripped between the clamp and front cutter. This grip, it will be noticed, is on the arm K, so that as the latter is thrown forward it brings a pull upon the rod, and at about the same time the feed-roller is actuated to feed the rod forward, as required. The pull made upon the rod by the vibration of the arm K is for the purpose of straightening out the kinking which is sometimes produced by the operation of the forging devices, so that the portion which is fed forward upon the anvil will always be straight. As soon as the forward feed of the rod is completed, the vibration of the cutter-holder releases the clamp, and at the same time the lever R is thrown down, so as to bring the arm K back into normal position, where it rests until another blank is formed and brought upon its side of the machine.

It will be seen that the feeding mechanism is duplicated, so as to provide for operating upon two rods, S S, the devices being constructed, arranged, and timed so as to act alternately in proper relation with the alternate action of the hooded rod-holders, which present the rods alternately to the anvil. In order to work properly, it is evident that the blank must be cut off, the rod straightened, and the clamp released before the corresponding rod-holder begins to move upward toward the anvil, which motion may commence as soon as the rod is released from the clamp, so as to then carry it up into position upon the anvil, while at the same time the other rod, with a blank formed on its end, is carried down to the cutters on the other side. The cutting off of the blanks is thus done at each side and below the anvil, and the rod having the formed blank will be entirely out of the way of the other rod, which is brought up into position to form a new blank. There is a slight bending of the rods in these movements, as illustrated in Fig. 5 of the drawings, but it is not sufficient to affect the operation of the devices unfavorably.

I have shown in the drawings a furnace, T, for the purpose of heating the rods, it being arranged directly underneath them and in front of the anvil. With this machine, in which there is a self-feeding device, this is an essential feature. If the self-feeding device is dispensed with, however, the rods may be heated in furnaces at one side and thrust into their holders by the attendant. The particular kind of heating-furnace is immaterial, and it is not necessary to give here any particular description of this device. The cutters may be arranged on stationary supports if it is not desired to give the pull on the rods and straighten them. This latter operation is, however, desirable, and in order to produce it the arms K K' commence their forward movement just a little before the feed-rollers move.

It will be noticed that the cams for operating the rod-holders and the cutters are on one and the same shaft, thus simplifying the construction.

It will be seen that the anvil is stationary. In order, then, to remove the blank laterally the anvil is made very narrow—in fact, but a little wider than the nail-blank—and the movement of the rod-holders laterally and downwardly is timed so that on the side of the reciprocating die D the movement will occur on the back movement of this die and while the roller-hammer is passing around after leaving the anvil. The same relation is also observed upon the return movement of the rod-holder; but on the other side of the anvil this movement of the rod-holder cannot be effected, for the reason that the die D' is stationary—that is, it has no reciprocating movement relative to the anvil. In order to provide for the required movement of the rod-holder, this die D' is pivoted at its outer end to the frame of the machine; or, in other words, its bed or support $d^2$ is hung upon a journal, $d^3$. The die is held in position for working by means of an arm, $d^4$, which depends from the sleeve at the outer end, and is provided with a roller, $d^5$, which runs in contact with a cam, U, on the longitudinal shaft $i^3$ at that side of the machine. This cam is circular throughout, with the exception of a slight depression, $u$, in its periphery, and therefore will hold the die firmly in working position, except when this depression is reached. A second cam, U', is mounted on the same shaft and is provided with a sharp projection, $u'$, upon its circular periphery. A roller, $d^6$, is mounted in flanges depending from the under side of the die-bed and is in contact with the cam U'. Evidently, when the projection $u'$ comes in contact with this roller it will be raised, thereby lifting or tilting the die upon its journal. The devices are so arranged that at the same moment the roller on the arm $d^4$ drops into the depression in the cam U to permit this tilting upward of the die, and this movement is timed to occur just when the rod-holder on that side of the machine is to be moved laterally and downwardly, or vice versa, thus providing an opening between the anvil and the stationary die through which the blank at the end of the rod may pass. The construction and arrangement of these parts is shown in Figs. 4 and 7 of the drawings. The construction of the cam-slot which guides and controls the movement of the rod-holders is such that just at the limit of the upward movement the holder is carried inward rapidly, thus providing for lifting the nail-rod as high as required for the anvil by the side of the latter, and then carrying it slightly inward to its proper seat. Of course a like movement is produced upon the reverse movement of these devices.

It is obvious that the movement of each of the rod-holders could be provided for by making both of the side dies reciprocating instead of one. I prefer, however, the construction shown, as it saves power and mechanism required to reciprocate both instead of one of the side dies.

There may be changes in the devices herein shown and described in carrying out my invention without departing from the main features of the improvement, and I do not wish to be understood as limiting myself to all the precise details of construction and arrangement which have been described above.

Having thus described my invention, what I claim as new in a machine for forging horseshoe nails, and desire to secure by Letters Patent, is—

1. A stationary anvil, in combination with a revolving roller-hammer, a pair of rod-holders, and mechanism whereby the latter are alternately moved laterally and vertically with reference to the anvil, substantially as and for the purposes specified.

2. A stationary anvil, in combination with a revolving roller-hammer, side dies, one of which is reciprocated, a pair of rod-holders, and mechanism for moving the latter laterally and vertically with reference to the anvil, substantially as and for the purposes specified.

3. A stationary anvil, in combination with a revolving roller-hammer, reciprocating side die D, side die D', mounted on a horizontal pivot, mechanism whereby the latter die may be raised and lowered at intervals, two rod-holders, and mechanism for alternately moving the latter laterally and downwardly from the anvil with a reverse movement of the companion holder, substantially as and for the purposes specified.

4. A stationary anvil, in combination with the two rod-holders, mechanism for alternately adjusting the rod-holders outwardly and downwardly from the anvil, cutters mounted on each side and below the anvil, and mechanism for operating said cutters alternately, substantially as and for the purposes specified.

5. The stationary anvil, in combination with the double rod-holders, cutters mounted on a vibrating support on each side of the anvil, a rod-clamp, also mounted on the same support, mechanism for alternately moving the rod-holders from the anvil to the cutters and back, and mechanism for vibrating the cutter and clamp-supports in a plane parallel to the feed of the rods, substantially as and for the purposes specified.

6. The main feeding devices, which feed the rod forward toward the anvil at proper intervals and grip it during the intervals of rest, in combination with a clamp mounted on a vibrating support and arranged to grip the rod just back of the blank formed at its end, mechanism whereby the clamp is operated to grip the rod, and mechanism whereby the clamp-support is then moved forward, timed to act slightly in advance of the operation of the main feeding devices, substantially as and for the purposes specified.

7. The stationary anvil, in combination with the two alternately-adjustable rod-holders, the cutters and clamps mounted on a vibrating support at each side of the anvil, mechanism for alternately operating the cutters and clamps to sever the blank and at the same time grip the end of the rod, mechanism for alternately moving the cutter and clamp-support forward in the direction of the feed, feeding devices which grip the rods, and mechanism to operate the feed just a little after the forward movement of the clamp, substantially as and for the purposes specified.

8. The main frame A, in combination with the rectangular supplementary frame $a$, mounted transversely on the main frame, and the roller-hammer shaft mounted within and surrounded by the said frame $a$, substantially as and for the purposes specified.

9. The anvil-support C, having the three branches $c$ $c'$, in combination with the anvil C', seated in said support, substantially as and for the purposes specified.

10. The anvil-support C, in combination with the anvil C', seated therein, the adjustable clasp-band $c^3$, and the set-screw $c^4$, arranged underneath the anvil, substantially as and for the purposes specified.

11. The anvil C', in combination with the revolving roller-hammer, the side-die carrier $d$, and lateral horizontally-swinging supports to which said carrier is attached, substantially as and for the purposes specified.

12. The side-die carrier $d$, in combination with the swinging link $d'$, attached to its outer end, a laterally-vibrating ring, F, connected to the inner end of said carrier, and mechanism for vibrating said ring laterally to and from the anvil, substantially as and for the purposes specified.

13. The die-carrier $d$, in combination with the revolving groove-cam E, the ring F, fitted in the cam-groove and connected below the cam to the die-carrier, and the ring F', mounted on trunnions outside of the ring F and connected above the cam to said ring and below the cam to the die-carrier, substantially as and for the purposes specified.

14. The support $d^2$ for the die D', pivoted at its outer end to the frame, in combination with the depending frame $d^4$ and the cams U and U', substantially as and for the purposes specified.

15. The upright bars H and H', provided with rod-holders $h$ at their upper ends, in combination with the crank-wheel $g$, to which they are attached at their lower ends, the circular cam-guide $h^3$, pins $h'$, entering the cam-slot in said guide, and mechanism for oscillating the crank-wheel, substantially as and for the purposes specified.

16. The upright arms H and H', having rod-holders $h$ at their upper ends, in combination with the crank-wheel $g$, to which they are attached at their lower ends, the cam-guide $h^3$, which receives pins on the said arms, the levers I, crank-wheel $g^3$ on the same shaft as the wheel $g$, pitmen $i$, and revolving cam $i^2$, substantially as and for the purposes specified.

17. The shafts $i^3$, arranged one at each side of the machine, in combination with the main shaft $j$, to which they are geared, the cams $i^2$, mounted on the former shafts, the pitmen $i$, the crank-wheel $g^3$ on the shaft G, the crank-wheel $g$ on the same rock-shaft, and the rod-holder supports connected to crank-wheel $g$, substantially as and for the purposes specified.

18. The supporting-arms K and K', in combination with the cutter-holder L, pivoted at the upper ends of said supports and provided with projections $l^3$, extending outward, and the cams $l'$, fixed on the side shafts, $i^3$, substantially as and for the purposes specified.

19. The supporting-arms K and K', provided at their upper ends with yokes, in combination with the cutter-holders L, pivoted in said yokes, the cutters $l^2$, arranged upon the bed of the holders, the cross-bars $l^3$, fastened to the bed by bolt and nut, and the actuating-cams L', substantially as and for the purposes specified.

20. The vibrating cutter-holder L, in combination with the cutter $l^2$, fastened to the holder and arranged to sever the blank from the rod just back of the head, a clamp, $l^4$, arranged in front of the said cutter and a little above it, and the stationary cutter M, substantially as and for the purpose specified.

21. The supporting-arms K and K', mounted loosely on the transverse shaft $k$, in combination with the cutters and clamps mounted on their upper ends, the levers R, attached at one end to the respective supports, the link-rods $r$, the crank-arms $o$, and mechanism for alternately vibrating said crank-arms, substantially as and for the purposes specified.

22. The vibrating supports K and K', in combination with the cutters and clamps mounted thereon, the levers R, links $r$, bell-crank levers O, and revolving cams $p$, substantially as and for the purposes specified.

23. The supports K and K', in combination with the vibrating cutters $l^2$, mounted thereon, stationary cutters M and M', also mounted on said supports, and the guard $m^2$, for directing the severed blanks outward, substantially as and for the purposes specified.

24. The feed-rollers N and Q, in combination with mechanism for operating the same, the clamps $l^4$, mounted on vibrating supports, and mechanism for vibrating said supports and clamps in the direction of the feed, timed to commence said movement a little before the movement of the feed-rollers, substantially as and for the purposes specified.

25. The feed-rollers N, mounted loosely on the shaft $n'$, in combination with the feed-rollers Q, the ratchet-wheels N', the bell-crank levers O, carrying pawls $n^2$, the revolving cams P, the levers R, connected to said bell-crank levers, and the arms K and K', carrying the cutters and clamps, substantially as and for the purposes specified.

26. The side shafts, $i^3$, arranged on each side of the machine, in combination with the double adjustable rod-holders and actuating-cams $i^2$ on said shafts, the vibrating cutters and their actuating-cams L', also mounted on said shafts, the vertically-vibrating die D', and the cams U and U', also mounted on the side shafts, whereby a single revolving shaft at each side of the machine operates the said die, rod-holders, and cutters, substantially as and for the purposes specified.

JOHN A. HUTCHINSON.

Witnesses:
ORSON H. BROOKE,
W. C. CORLIES.